(No Model.) 2 Sheets—Sheet 1.
P. CAMPBELL & F. A. NEIDER.
Fifth Wheel for Vehicles.
No. 238,345. Patented March 1, 1881.
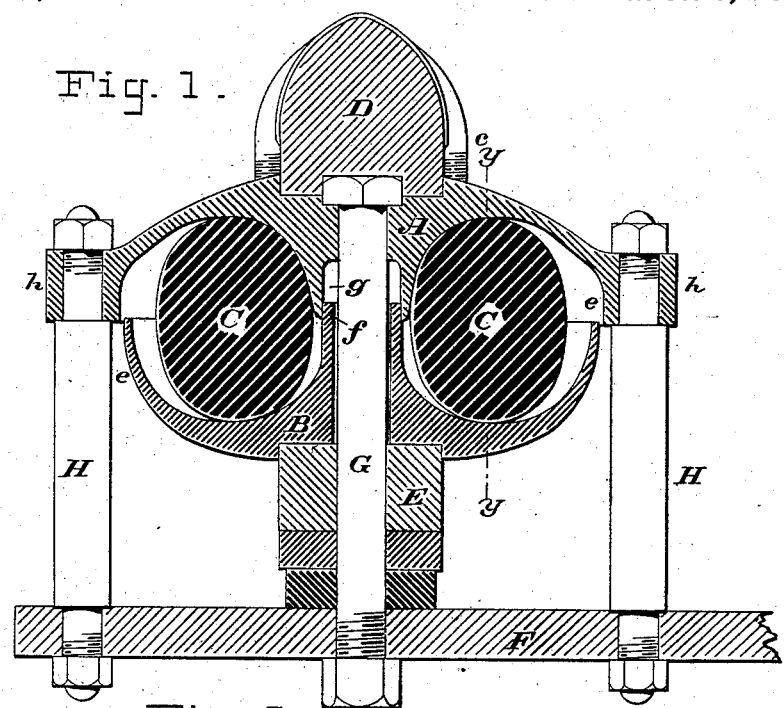
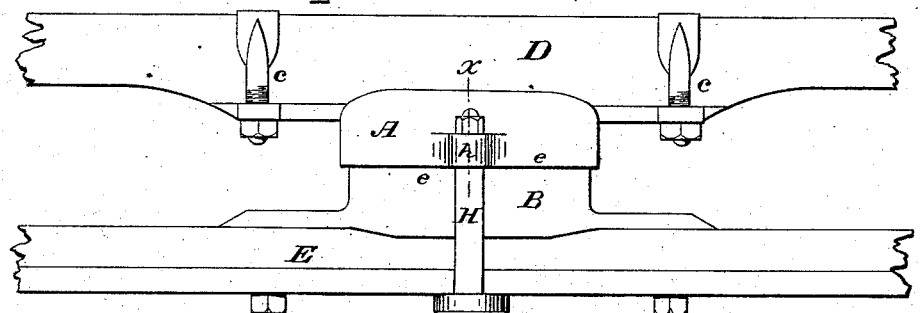
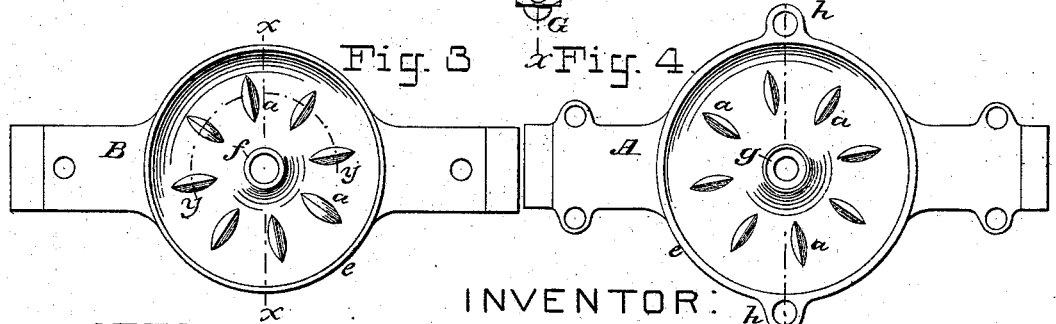
ATTEST:
E. B. Bolton
Geo Bainton
INVENTOR:
Peter Campbell
Fred. A. Neider
By Burke, Fraser & Connett, Attys.

(No Model.) 2 Sheets—Sheet 2.
P. CAMPBELL & F. A. NEIDER.
Fifth Wheel for Vehicles.
No. 238,345. Patented March 1, 1881.
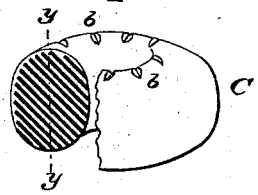
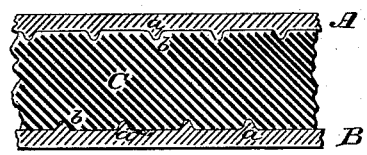
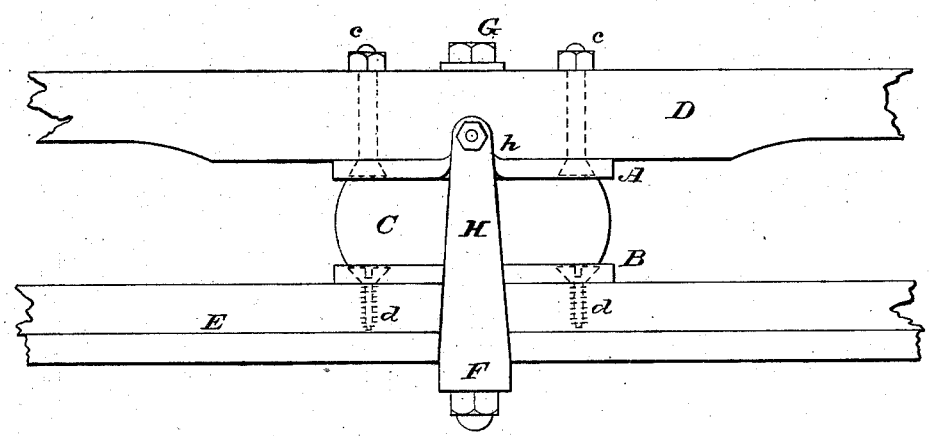
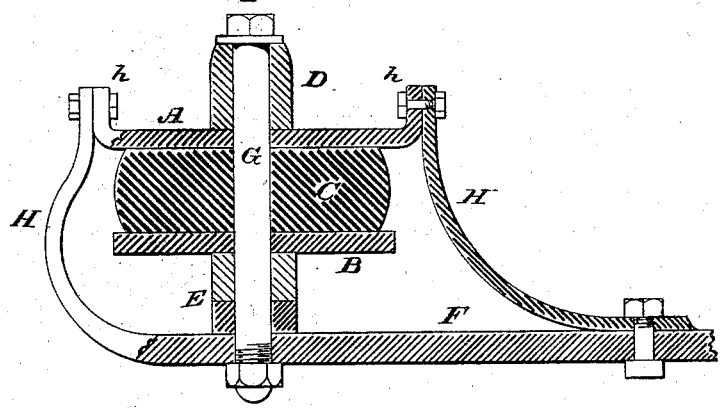
ATTEST:
E. B. Bolton
Geo. Bainton
INVENTOR:
Peter Campbell,
Fred A. Neider,
By Burke, Fraser Bonnett
Attys.